US012005717B2

(12) United States Patent
Navas Sanchez

(10) Patent No.: US 12,005,717 B2
(45) Date of Patent: Jun. 11, 2024

(54) PRINTER VALVE ASSEMBLIES

(71) Applicant: HEWLETT-PACKARD DEVELOPMENT COMPANY, L.P., Spring, TX (US)

(72) Inventor: Borja Navas Sanchez, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 170 days.

(21) Appl. No.: 17/762,622

(22) PCT Filed: Oct. 7, 2019

(86) PCT No.: PCT/US2019/055023
§ 371 (c)(1),
(2) Date: Mar. 22, 2022

(87) PCT Pub. No.: WO2021/071467
PCT Pub. Date: Apr. 15, 2021

(65) Prior Publication Data
US 2022/0348024 A1 Nov. 3, 2022

(51) Int. Cl.
*B41J 2/175* (2006.01)
*B41J 2/18* (2006.01)

(52) U.S. Cl.
CPC ............. *B41J 2/17596* (2013.01); *B41J 2/18* (2013.01)

(58) Field of Classification Search
CPC ........... B41J 2/17596; B41J 2/18; B41J 2/175
See application file for complete search history.

(56) References Cited

U.S. PATENT DOCUMENTS

| | | | |
|---|---|---|---|
| 6,318,834 B1 | 11/2001 | Otsuka et al. | |
| 6,523,944 B1 | 2/2003 | Roy et al. | |
| 6,543,887 B2 | 4/2003 | Chang et al. | |
| 10,286,601 B2 | 5/2019 | Chang | |
| 10,569,561 B2 * | 2/2020 | Arnold | B41J 29/02 |
| 11,254,139 B2 * | 2/2022 | Leiser | B41J 2/1752 |
| 2005/0068364 A1 | 3/2005 | Kayanaka | |

(Continued)

FOREIGN PATENT DOCUMENTS

| | | |
|---|---|---|
| CN 105856561 A | 8/2016 |
| WO WO-2016149032 A1 | 9/2016 |
| WO WO-2017184839 A1 | 10/2017 |

*Primary Examiner* — An H Do
(74) *Attorney, Agent, or Firm* — Jordan IP Law, LLC

(57) ABSTRACT

A printer valve assembly including a plurality of valves. Each of the valves is actuated between an open state which permits fluid flow though the valve and a closed state which prevents fluid flow though the valve. The plurality of valves includes a first feed valve, a first return valve, a waste valve and a purge valve. The first feed valve controls flow between a source of first print fluid and a feed line to a print head. The first return valve controls flow between a return line from a print head and a source of first print fluid. The waste valve controls flow between a return line from a print head to a waste receiver. The purge valve controls flow between a source of purge fluid and a feed line. The printer valve assembly further includes a valve control member which is mechanically connected to the valves to simultaneously control the state of the valves based on a position of the valve control member.

13 Claims, 5 Drawing Sheets

(56) References Cited

U.S. PATENT DOCUMENTS

| | | | |
|---|---|---|---|
| 2007/0008368 | A1 | 1/2007 | Maru et al. |
| 2014/0020189 | A1 | 1/2014 | Weibel et al. |
| 2016/0009029 | A1 | 1/2016 | Cohen et al. |
| 2019/0111687 | A1 | 4/2019 | Keefe et al. |

* cited by examiner

PRINTER VALVE ASSEMBLIES

BACKGROUND

Printers may use a print head to emit a print fluid, such as a liquid ink or dye, onto a substrate to create an image. The substrate may be a sheet of paper, but could be any other substrate. The print head may be supplied with the print fluid from a print fluid source, for example a print fluid chamber. The print head may be moved relative to the substrate in order to dispense print fluid in different locations on the substrate. The print head may be caused to emit, or eject, a predetermined amount of that fluid, for example a droplet, onto the substrate when required to create a desired image. This ejection of the print fluid may be through the use of any suitable mechanism, for example a piezoelectric element, a piston, or thermal ejection.

Some industrial printers may recirculate print fluid within the print fluid delivery system and print head to avoid issues such as pigment settling, temperature variation and/or particle accumulation within the print head. Some printers make use of a single print head which includes a nozzle through which a plurality of different print fluids can be ejected at different times.

BRIEF DESCRIPTION OF THE DRAWINGS

Some non-limiting examples of the present disclosure will be described in the following with reference to the appended drawings in which.

DETAILED DESCRIPTION

As noted above, printers may include a single print head which may include a nozzle through which a plurality of different print fluids can be ejected at different times. To avoid print fluid contamination a printer may include a valve assembly which allows the print head to be isolated from one print fluid source, for example a print fluid chamber, before being connected to another. Print fluid remaining in the feed and return lines that couple the valve assembly to the print head may be purged after the print head has been isolated from one print fluid chamber and before the print head is connected to another print fluid source.

Figure 1:
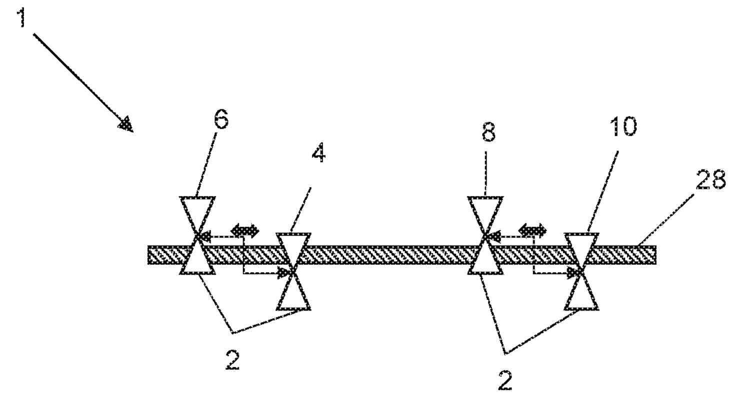
FIG. 1 shows a schematic of an example printer valve assembly.
Figure 2:
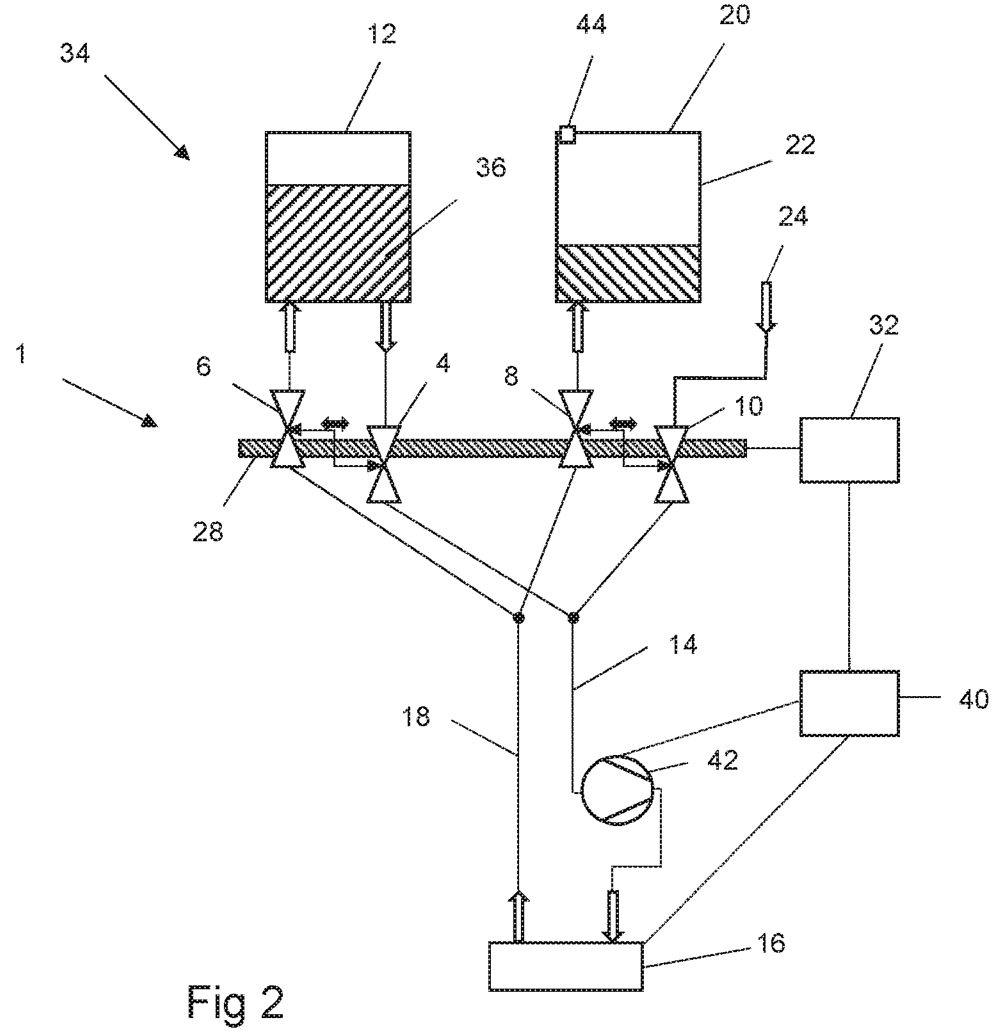
FIG. 2 shows a schematic of an example printer.

FIG. 1 shows a printer valve assembly 1 comprising a plurality of valves 2 and FIG. 2 shows a schematic of an example of a printer 34 which includes such a printer valve assembly 1. Each of the plurality of valves 2 can be actuated between an open state which permits fluid flow though the valve 2 and a closed state which prevents fluid flow though the valve 2.

The plurality of valves 2 comprises a first feed valve 4, a first return valve 6, a waste valve 8 and a purge valve 10. As can be seen in more detail FIG. 2, the first feed 4 valve is to control flow between a source of first print fluid, in this case a first print fluid chamber 12 and a feed line 14 to a print head 16. The first return valve 6 is to control flow between a return line 18 from a print head 16 and a first print fluid chamber 12. The waste valve 8 is to control flow between a return line 18 from a print head 16 to a waste receiver 20, which may be an absorbent pad or other fluid store and in this example is a waste chamber 22. The purge valve 10 is to control fluid flow between a source of purge fluid 24, in this case an air inlet and a feed line 14 to the print head 16.

The printer valve assembly 1 further comprises a valve control member 28 which is mechanically connected to each of the plurality of valves 2 to simultaneously control the state of the plurality of valves 2 based on a position of the valve control member 28.

Simultaneously controlling the state of the plurality of valves 2 using a mechanical connection to a valve control member 28 may mean that coordination of the actuation of the plurality of valves 2 can be pre-determined by the connection of the plurality of valves 2 to the valve control member 28 and/or the configuration of the valve control member 28. This may prevent incorrect actuation timing of one of the plurality of valves 2 due to, for example, a user, firmware or software error. Incorrect actuation timing of one of the plurality of valves 2 could lead to print fluid contamination or loss of print fluid.

The mechanical connection between the valve control member 28 can be any suitable connection that allows the state of each of the plurality of valves 2 to be determined based upon the position of the valve control member 28. For example, the valve control member 28 may be a gear wheel which engages with a gear train that engages each of the plurality of valves 2 so that the rotatory position of the gear wheel determines the actuation state of each of the plurality of valves 2. The valve control member 28 may be a form of cam shaft which extends along a shaft axis and which includes cam surfaces which extend radially or axially relative to the shaft axis. The cam surfaces may engage valve members directly, or via linking or coupling members. The mechanical connection may alternatively, or additionally, comprise a drive belt, drive chain or gear train that couples the valve control member 28 to a secondary valve control member, for example a twin camshaft arrangement could be used with the camshafts being coupled by a drive belt so that the rotary position of one cam shaft can determine the rotary position of the other cam shaft.

The mechanical connection between the valve control member 28 may mean that a single actuator 32, for example a motor, or manually movable element, can be used to control the position of the valve control member 28 and thus control the actuation state of all of the plurality of valves 2 and this may simplify control of the printer valve assembly 1. The position of the valve control member 28 maybe controlled so that rotation of the control member is controlled about an axis, about two perpendicular axes, or about three mutually perpendicular axes. The position of the valve control member 28 maybe controlled so that translation of the control member is controlled along an axis, along two perpendicular axes, or along three mutually perpendicular axes. A combination of such rotation and translation may be controlled.

FIG. 2 shows a schematic of an example printer 34. The first print fluid chamber 12 contains a first print fluid 36, in this case a first ink.

In an example operation a controller 40 controls the actuator 32 to move the valve control member 28 to a first position in which the first feed valve 4 and first return valve 6 are open and the waste valve 8 and purge valve 10 are closed. The controller 40 of this example also controls a pump 42 in the feed line 14 to draw the first print fluid 36 from the first print fluid chamber 12 through the first feed valve 4, along the feed line 14 through the pump 42 and to the print head 16. The controller 40 of this example also controls the print head 16 to dispense predetermined amounts of the first print fluid 36. First print fluid 36 not dispensed from the print head 16 passed along the return line 18, through the first return valve 6 and back to the first print fluid chamber 12. This provides a macro recirculation of the first print fluid 36 from the first print fluid chamber 12 to the print head 16 and back to the first print fluid chamber 12. It should be understood that a different controller may control each element of the printer and that in some examples certain features may not be automatically controlled by a controller, but could be controlled manually.

When dispensing of first print fluid 36 is no longer desired the controller 40 controls the motor 32 to move the valve control member to a purge position in which the first feed valve 4 and first return valve 6 are closed and the waste valve 8 and purge valve 10 are open. Closing the first feed valve 4 and the first return valve 6 traps some of the first print fluid 36 within the feed line 14, print head 16 and the return line 18.

The controller 40 then controls a pump 42 in the feed line 14 to draw air from the purge fluid source 24 through the purge valve 10, along the feed line 14 through the pump 42 and to the print head 16. The air then passes from the print head 16 along the return line 18 through the waste valve 8 and into the waste chamber 22. The waste chamber 22 may include a vent 44, for example an air vent.

Figure 5:
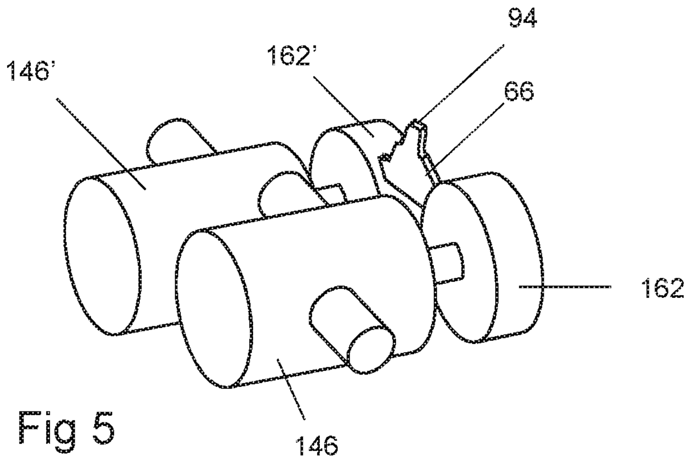
FIG. 5 shows an example of valves coupled together.

Passing air through the feed line 14, print head 16 and the return line 18 forces the trapped first print fluid 36 to be purged into the waste chamber 22. Although atmospheric air is used in this example as it is readily available any purge fluid could be used and could be supplied from a purge fluid source. Example purge fluids include water, a compressed gas such as compressed air or carbon dioxide or a liquid solvent. Purging the trapped first print fluid 36 into the waste chamber 22 prevents the trapped first ink from going 'stale', for example drying out, or from particulates within the print fluid settling in the feed line 14, print head 16 or the return line 18. It also clears the feed line 14, print head 16 and the return line 18 of first print fluid 36 so that a second ink can be introduced with minimal contamination. This could be achieved by using an different print fluid chamber that is already installed, as shown in FIG. 5, or by switching the first print fluid chamber 12 for a replacement print fluid chamber (not shown) containing a replacement print fluid. It should be understood that the flow path between the replacement print fluid chamber and the feed line 14 and return line 18 may still contain a small amount of first print fluid 36, but the macro recirculation of fluid of the replacement print fluid should result in minimal contamination of the replacement fluid.

Figure 3:
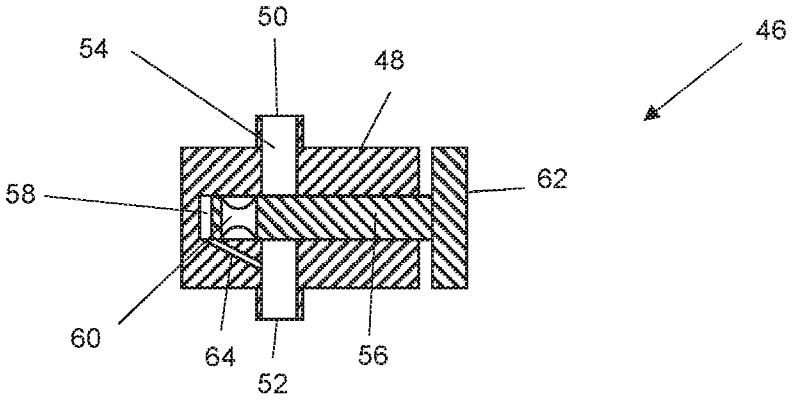
FIG. 3 shows a cross section of an example valve in a closed position.
Figure 4:
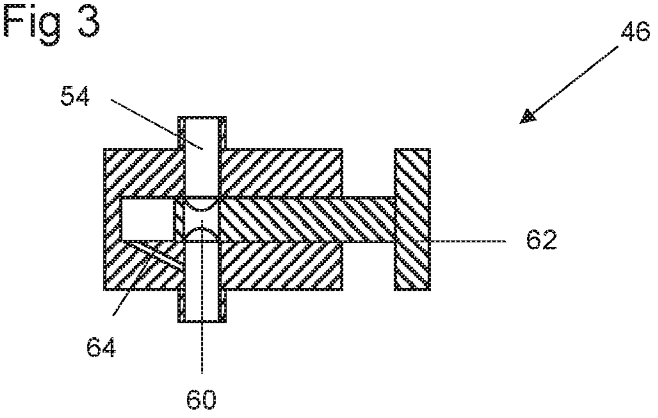
FIG. 4 shows a cross section of an example valve in an open position.

FIG. 3 shows a cross section of an example valve 46 in a closed position and FIG. 4 shows a cross section of an example valve 46 in an open position. The valve 46 is suitable for use in some of the example printer valve assemblies described herein. The valve 46 comprises a valve body 48 having an inlet 50 and an outlet 52. A flow path 54 through the valve body 48 links the inlet 50 and the outlet 52. The flow path 54 can be blocked by a valve member 56, as shown in FIG. 3, to prevent fluid flow between the inlet 50 and the outlet 52.

The valve member 56 moves within a channel 58 within the valve body 48. The channel 58 extends perpendicular to the flow channel 54. The valve member 56 includes an open portion 60 which, when aligned with the flow path 54, as shown in FIG. 4, allows fluid to pass from the inlet 50 to the outlet 52. The valve member 56 comprises a head 62 which can be engaged to move the valve member 56 relative to the valve body 48 to allow the valve 46 to be actuated between an open state which permits fluid flow though the valve 46 and a closed state which prevents fluid flow though the valve 46.

The valve 46 further includes a vent channel 64 which fluidly links the outlet 52 to a distal portion to the channel 58 so that fluid can flow into, or out of, the channel 58 as the valve member 56 moves along the channel 58.

In this example the valve member 56 moves in a substantially linear sliding manner within the channel 58. This linear translation provides a simple actuation mechanism for the valve 46.

Although in this example the valve 46 is shown as having a linear actuation, valve with a rotary, or other actuation can be used in a printer valve assembly.

FIG. 5 shows two valves 146,146' coupled together by a coupler 66. The coupler 66 links the heads 162,162' of the two valves 146,146' so that movement of the coupler 66 can causes simultaneous actuation of the two valves 146,146'. In this example the coupler 66 includes a projection 94 which can engage with a valve control member so that the valve control member can determine the position of the coupler and hence the actuation state of the valves 146,146'.

Figure 6:
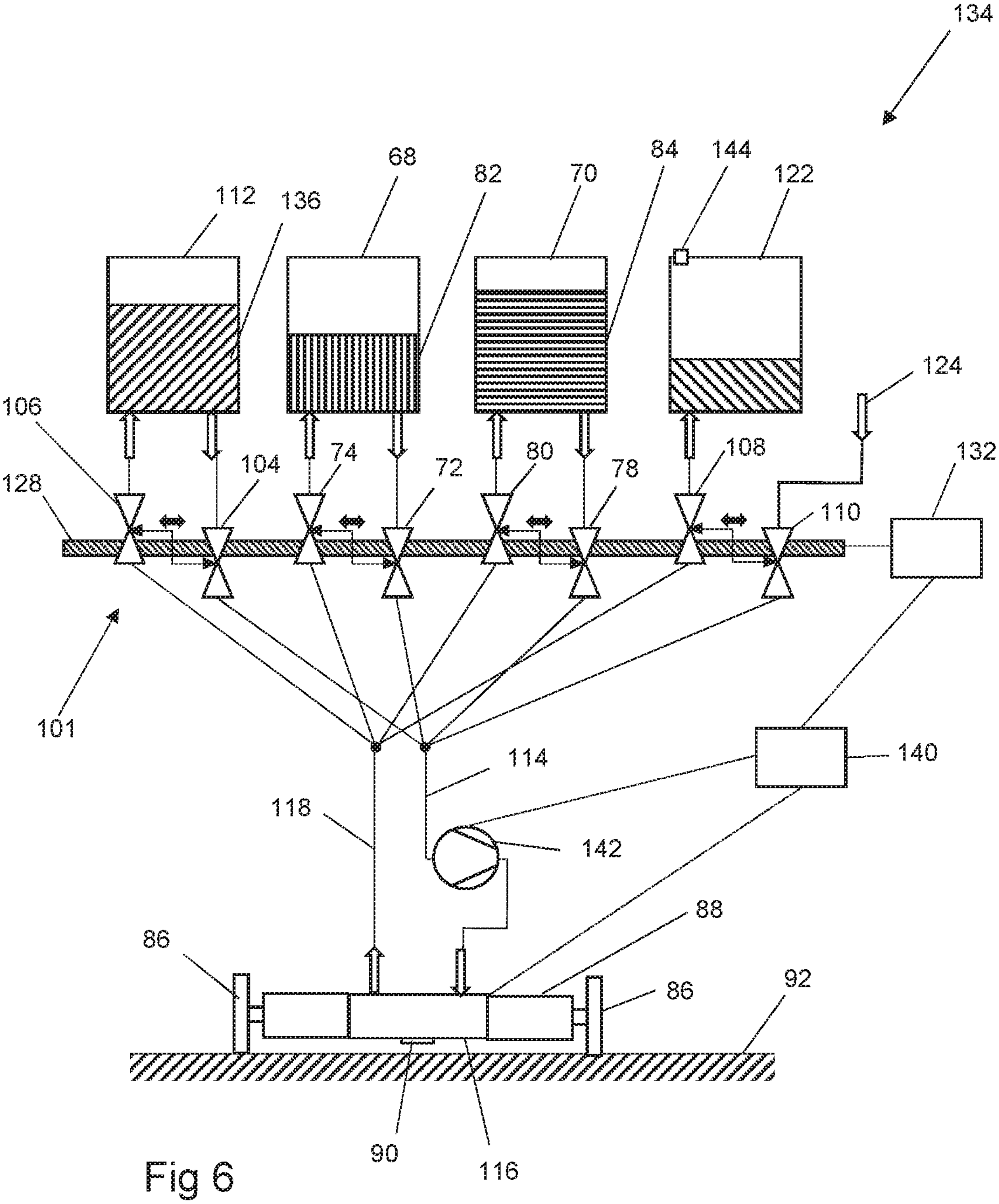
FIG. 6 shows a schematic of another example of a printer.

FIG. 6 shows a schematic of another example of a printer 134. The printer 134 is similar to the printer 34 of FIG. 2 and like features are referenced with the same reference numerals incremented by 100.

A difference between printer 134 and printer 34 is that the valve assembly 101 of the printer 134 includes second and third print fluid chambers 68,70 and plurality of valves which comprises the same valves as the plurality of valves 2 of FIGS. 1 and 2 and additionally comprises a second feed valve 72, a second return valve 74, a third feed valve 78 and a third return valve 80. The second feed valve 72 controls flow between the second print fluid chamber 68 and a feed line 114 to a print head 116. The second return valve 74 controls flow between a return line 118 from the print head 116 and the second print fluid chamber 68. The third feed valve 78 controls flow between the third print fluid chamber 70 and the feed line 114 to the print head 116. The third return valve 80 controls flow between the return line 118 from the print head 116 and the third print fluid chamber 70.

The second print fluid chamber 68 contains a second print fluid 82, in this case a second ink, for example a second colour ink. The third print fluid chamber 70 contains a third print fluid 84, in this case a third ink, for example a third colour ink. In some examples the first, second and third inks may comprise three colours which can be combined on a substrate to produce any colour desired, for example red, green and blue.

The valve control member 128 of printer 134 includes a first position in which the first feed valve 104 and first return valve 106 are open and the waste valve 108, purge valve 110 and second and third feed and return valves 72,74,78,80 are all closed. In this first position the valve assembly 101 couples the first print fluid chamber 112 to the feed and return lines 114,118.

The valve control member 128 of printer 134 includes a second position in which the second feed valve 72 and second return valve 74 are open and the waste valve 108, purge valve 110 and first and third feed and return valves 104,106,78,80 are all closed. In this second position the valve assembly 101 couples the second print fluid chamber 68 to the feed and return lines 114,118.

The valve control member 128 of printer 134 includes a third position in which the third feed valve 78 and third return valve 80 are open and the waste valve 108, purge valve 110 and first and second feed and return valves 104,106,72,74 are all closed. In this third position the valve assembly 101 couples the third print fluid chamber 70 to the feed and return lines 114,118.

The valve control member 128 of printer 134 includes a purge position in which the waste valve 108 and purge valve 110 are open and the first, second and third feed and return valves 104,106,72,74,78,80 are closed. In this purge position the valve assembly 101 couples the air inlet 126 to the feed line 114 and couples the return line 118 to the waste chamber 122.

Operation of the printer 134 is similar to that of printer 34. In an example operation a controller 140 controls the actuator 132 to move the valve control member 128 to the first, second or third position.

Depending upon the position of the valve control member 128, the controller 140 controls a pump 142 in the feed line 114 to draw the first, second or third print fluid 136,82,84 from the first, second or third print fluid chamber 112,68,70 through the first feed valve 104, along the feed line 114 through the pump 142 and to the print head 116.

The controller 140 controls the print head 116 to dispense predetermined amounts of print fluid 136,82,84. Print fluid 136,82,84 not dispensed from the print head 116 passed along the return line 118, through the first return valve 106 and back to the relevant print fluid chamber 112,68,70.

When dispensing of print fluid 136,82,84 is no longer required, or dispensing of a different print fluid 136,82,84 is desired, the controller 140 controls the motor 132 to move the valve control member 128 to the purge position.

The controller 140 then controls the pump 142 in the feed line 114 to draw air from the purge fluid source 124 and purge trapped print fluid 136,82,84 into the waste chamber 122.

The controller 140 then controls the motor 132 to move the valve control member 128 to the first, second or third position and the operation to dispense a print fluid 136,82,84 which may be the same or different to the print fluid previously dispensed, can commence.

Thus operation of the printer 134 starting from a purged, or empty, state comprises the controller 140 controlling the motor 132 to change the position of the valve control member to an initial position, one of the first, second, or third positions and then using the pump to recirculate print fluid from the print fluid chamber coupled to the feed and return lines 114,118 so that print fluid can be dispensed from the print head 116. To switch print fluid the controller 140 controls the motor 132 to change the position of the valve control member 128 to a purge position to allow the feed line 114, return line 118 and print head 116 to be purged of print fluid prior to the controller 140 controlling the motor 132 to change the position of the valve control member to a subsequent position, one of the first, second, or third positions. The controller can then use the pump to recirculate print fluid from the print fluid chamber coupled to the feed and return lines 114,118 so that print fluid can be dispensed from the print head 116.

Printer 134 further includes wheels 86 coupled to a chassis 88 which carries the print head 116. The wheels 86 can be driven under the control of the controller 140 to move the print head 116 relative to a surface 92 on which the printer 134 sits. IN this case the wheels 86 are differential steering wheels and the print head 116 includes an outlet nozzle 90 from which print fluid is dispensed and which is located mid-way between the wheels 86. The chassis 88 may include a further wheel to stabilise the chassis 88 during movement.

Although a print head can be moved in this way, it should be understood that other ways to achieve movement between a print head and substrate are possible. For example the print head can be moved using, for example a belt and/or chain drive relative to a frame. A print head can also/alternatively be moved relative to a frame using a mechanical linkage. If the print head is being moved relative to a frame it is possible for the substrate to remain static relative to the frame. It is also possible for the substrate to be moved relative to the print head and/or frame. Moving the print head relative to a substrate means that print fluid ejected from the print head can be deposited on different areas of the substrate.

Figure 7:
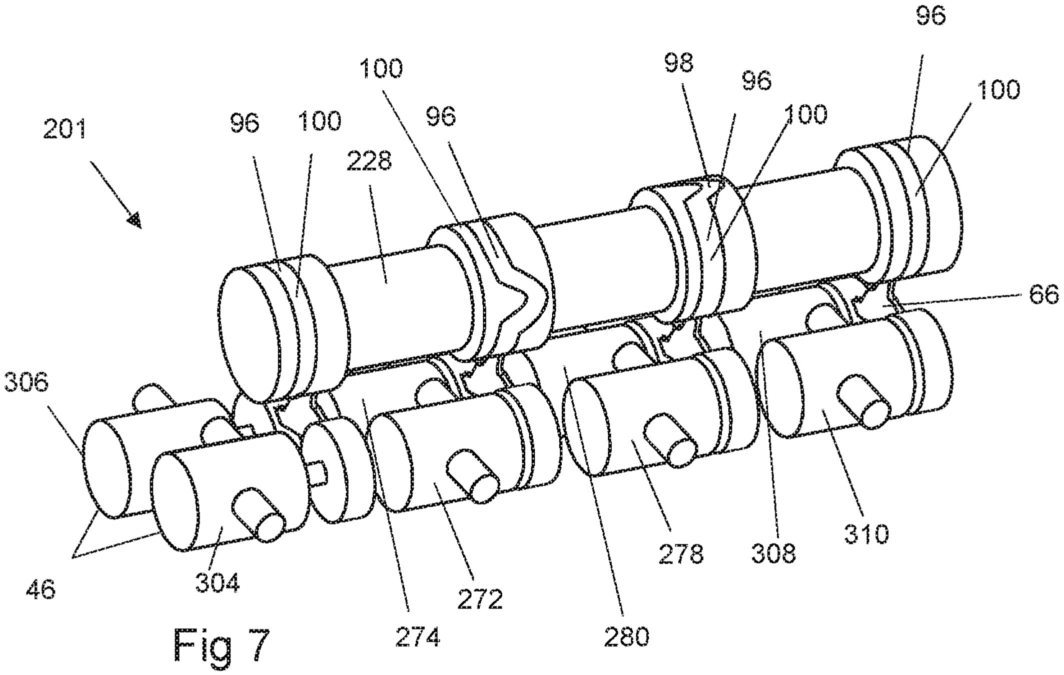
FIG. 7 shows an example of a printer valve assembly in a first state.
Figure 8:
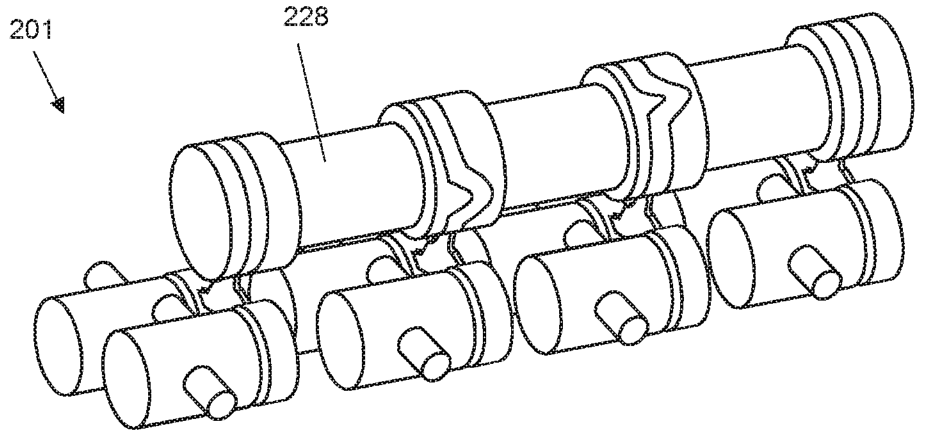
FIG. 8 shows an example of the printer valve assembly of FIG. 7 in a second state.

FIG. 7 and FIG. 8 show an example of a printer valve assembly 201. The printer valve assembly 201 is similar to the printer valve assembly of FIG. 6 and like features are referenced with the same numerals incremented by 200.

In this example the printer valve assembly 201 comprises four pairs of the valves 46 of FIGS. 3 and 4. The valves 46 of each pair are linked by a coupler 66. Each coupler 66 includes a projection 94. The valve control member 228 of this example comprises a rotatable drum, but as set out above, other valve control members could be used. The valve control member 228 include four circumferential cam tracks 96.

The valve control member 228 includes four circumferential cam tracks 96. Each of the cam tracks 96 engages a projection from one of the couplers 66. Each cam track 96 has an open portion 98 in which the valve coupler 66 engaged with cam track 96 holds the valves 46 to which it is linked in an open position. Each cam track 96 also includes a closed portion 100 in which the valve coupler 66 engaged with cam track 96 holds the valves 46 to which it is linked in a closed position.

The open portions of the cam tracks may be circumferentially offset from one another. In this example the centre the open portions 98 of each cam track 96 are offset from one another by 90° so that first, second, third and fourth positions are provided as described in connection with FIG. 6. The first, second, third and fourth positions of the valve control member are offset by 90 degrees so that rotation of the valve control member 228 by 90° moves the valve control member 228 between the different positions. FIG. 7 shows a first position of the valve control member 228 in which the first feed valve 104 and first return valve 106 are held open and the remaining valves are held closed.

FIG. 8 shows an intermediate position of the valve control member 228 in which all valves are held closed. The intermediate position is 45° offset from the first position of FIG. 7.

As noted above, a printer valve assembly may comprise a plurality of valve couplers. The first feed valve and first return valve may be linked by a first valve coupler. The second feed valve and second return valve may be linked by a second valve coupler. The third feed valve and third return valve may be linked by a third valve coupler. The waste valve and purge valve may be coupled by a purge valve coupler. Each of the couplers link the respective valves so that the linked valves are actuated together.

The cam tracks 96 and couplers 66 of the printer valve assembly 201 may be arranged so that no more than one coupler 66 is engaged with an open portion in any rotational position of the valve control member 228. In a different example each valve 46 may be coupled directly to the valve control member so that they can be actuated individually depending upon the configuration of the valve control member. Such an arrangement may provide a greater degree of control over the position of individual valves.

Figure 9:
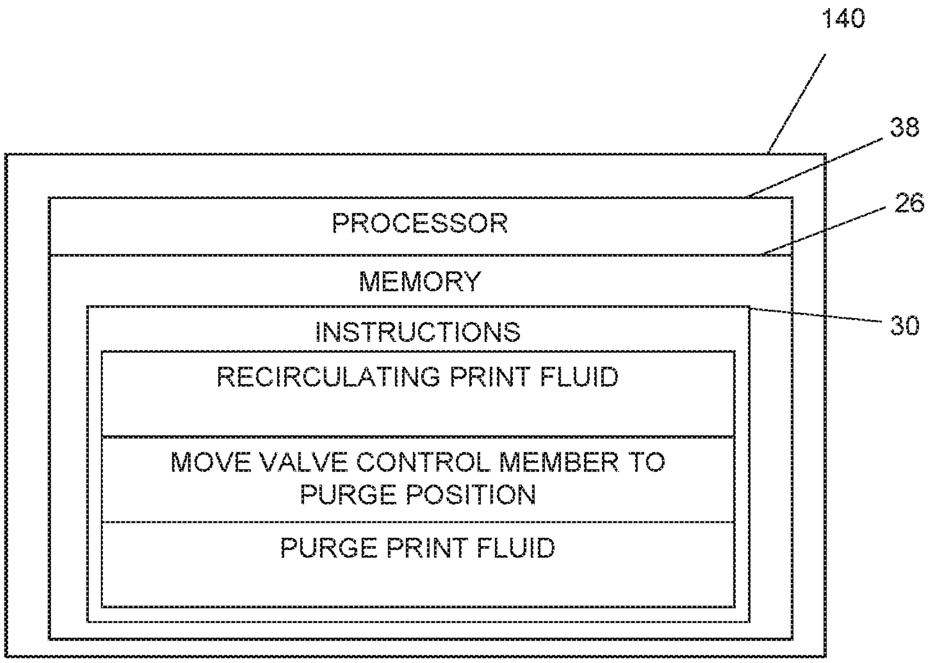
FIG. 9 shows a simplified block diagram of an example of a controller for a printer.

FIG. 9 shows an example of a controller 140. In this example the controller 140 comprises a non-transitory computer-readable storage medium 26 comprising computer executable instructions 30 which, when executed by a processor 38, cause the printer 134 to perform a method.

The method comprises using the pump 142 to recirculate an initial print fluid from an initial print fluid chamber via a feed line 114 to a print head 116 and back to the print fluid chamber via a return line 118.

The method also comprises using an actuator 132 to move a valve control member 128 to close valves to isolate the print head 116 from a first print fluid chamber and to subsequently open valves to fluidly connect the print head 116 to a purge fluid source 126 and a waste receiver 122.

The method also includes using the pump 142 to cause a purge fluid to flow from the purge fluid source 126 through the feed line 114 and return line 118 to purge the initial print fluid from the feed line 114, print head 116 and return line 118 into the waste receiver 122.

The method may further comprise using the actuator 132 to move the valve control member 128 to close valves to isolate the print head 116 from the waste chamber 122 and the purge fluid source 126 and to open valves to fluidly connect the print head 116 to a subsequent print fluid chamber containing a subsequent print fluid.

The method may also include using a pump 142 to recirculate the subsequent print fluid from the subsequent print fluid chamber via the feed line 114 to a print head 116 and back to the subsequent print fluid chamber via the return line 118.

The method may further comprise using the print head 116 to dispense a print fluid which is flowing therethrough.

The invention claimed is:

1. A printer valve assembly comprising:

a plurality of valves, wherein each of the plurality of valves is actuated between an open state which permits fluid flow though the valve and a closed state which prevents fluid flow though the valve, the plurality of valves comprising a first feed valve, a first return valve, a waste valve and a purge valve, the first feed valve to control flow between a first print fluid chamber and a feed line to a print head, the first return valve to control flow between a return line from a print head and a first print fluid chamber, the waste valve to control flow between a return line from a print head to a waste receiver and the purge valve to control flow between a source of purge fluid and a feed line, the printer valve assembly further comprising a valve control member, wherein the valve control member is mechanically connected to each of the plurality of valves to simultaneously control the state of the plurality of valves based on a position of the valve control member, wherein the plurality of valves further comprises a second feed valve, a second return valve, a third feed valve and a third return valve, the second feed valve to control flow between a second print fluid chamber and a feed line to a print head, the second return valve to control flow between a return line from a print head and a second print fluid chamber, and the third feed valve to control flow between a third print fluid chamber and a feed line to a print head, the third return valve to control flow between a return line from a print head and a third print fluid chamber.

2. A printer valve assembly as claimed in claim 1, in which the assembly comprises a plurality of valve couplers, wherein the first feed valve and first return valve are linked by a first valve coupler, the second feed valve and second return valve are linked by a second valve coupler, the third feed valve and third return valve are linked by a third valve coupler, and the waste valve and purge valve are coupled by a purge valve coupler, each of the couplers linking the respective valves so that the linked valves are actuated together.

3. A printer valve assembly as claimed in claim 2, in which the valve control member comprises a rotatable drum, the drum including four circumferential cam tracks, each valve coupler engaged with a respective cam track of the drum, the rotational position of the drum determining the circumferential portion of the cam tracks with which the couplers are engaged.

4. A printer valve assembly as claimed in claim 3, in which each of the circumferential cam tracks comprises an open portion in which the valve coupler engaged with cam track holds the valves to which it is linked in an open position and a closed portion in which the valve coupler engaged with cam track holds the valves to which it is linked in a closed position.

5. A printer valve assembly as claimed in claim 4, in which the cam track and couplers are arranged so that no more than one coupler is engaged with an open portion in any rotational position of the drum.

6. A printer valve assembly as claimed in claim 5, in which the open portions of the cam tracks are circumferentially offset from one another.

7. A printer, the printer comprising:

a print head, a pump, a source of first print fluid, a waste receiver, a purge fluid feed, an actuator and a printer valve assembly, the print head being coupled to the printer valve assembly by a feed line and a return line, the printer valve assembly comprising a plurality of valves, wherein each of the plurality of valves can be actuated between an open state which permits fluid flow though the valve and a closed state which prevents fluid flow though the valve, the plurality of valves comprising a first feed valve to control fluid flow between the source of first print fluid and the feed line, a first return valve to control fluid flow between the return line and the source of first print fluid, a waste valve to control fluid flow between the return line and the waste receiver and a purge valve to control fluid flow between the purge fluid source and the feed line, wherein a valve control member is mechanically connected to each of the plurality of valves to simultaneously control the state of the plurality of valves based on a position of the valve control member, the printer further comprising a controller to control the actuator to determine the position of the valve control member to selectively fluidly couple the print head to the source of first print fluid via the feed and return lines, or to fluidly couple the waste receiver to the purge fluid feed via the feed and return lines, wherein the printer further comprises a source of second print fluid and a source of third print fluid and the plurality of valves further comprises a second feed valve to control fluid flow between the source of second print fluid and the feed line, a second return valve to control fluid flow between the return line and the source of second print fluid, a third feed valve to control fluid flow between the source of third print fluid and the feed line, a third return valve to control fluid flow between the return line and the source of third print fluid.

8. A printer as claimed in claim 7, in which the purge fluid feed is an air feed.

9. A printer as claimed in claim 7, in which the waste receiver is a waste fluid chamber.

10. A printer as claimed in claim 7, in which the pump is arranged in the feed line to cause fluid to flow to the print head along the feed line.

11. A non-transitory computer-readable storage medium comprising computer executable instructions which, when executed by a processor, cause a printer to perform a method, the method comprising:

actuating a plurality of valves using an actuator, wherein each of the plurality of valves is actuated between an open state which permits fluid flow though the valve and a closed state which prevents fluid flow though the valve, the plurality of valves comprising a first feed valve, a first return valve, a waste valve and a purge valve;

controlling the first feed valve to control flow between a first print fluid chamber and a feed line to a print head;

controlling the first return valve to control flow between a return line from a print head and a first print fluid chamber;

controlling the waste valve to control flow between a return line from a print head to a waste receiver;

controlling the purge valve to control flow between a source of purge fluid and a feed line, wherein a printer valve assembly comprises a valve control member mechanically connected to each of the plurality of valves to simultaneously control the state of the plurality of valves based on a position of the valve control member, wherein the plurality of valves further comprises a second feed valve, a second return valve, a third feed valve and a third return valve;

controlling the second feed valve to control flow between a second print fluid chamber and a feed line to a print head;

controlling the second return valve to control flow between a return line from a print head and a second print fluid chamber;

controlling the third feed valve to control flow between a third print fluid chamber and a feed line to a print head; and controlling the third return valve to control flow between a return line from a print head and a third print fluid chamber.

12. A non-transitory computer-readable storage medium as claimed in claim 11, in which the method further comprises:

using the actuator to move the valve control member to close each of the plurality of valves to isolate the print head from the waste chamber and the purge fluid source and to open the plurality of valves to fluidly connect the print head to a subsequent print fluid chamber containing a subsequent print fluid;

using a pump to recirculate the subsequent print fluid from the subsequent print fluid chamber via the feed line to the print head and back to the subsequent print fluid chamber via the return line.

13. A non-transitory computer-readable storage medium as claimed in claim 11, in which the method further comprises using the print head to dispense the first print fluid which is flowing therethrough.

* * * * *